US011849737B2

(12) United States Patent
Rupp

(10) Patent No.: US 11,849,737 B2
(45) Date of Patent: Dec. 26, 2023

(54) FOOD-GRADE SHAPER AND CONTAINER FOR FROZEN CONFECTIONS

(71) Applicant: Snowie LLC, Salt Lake City, UT (US)

(72) Inventor: Carl A Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 724 days.

(21) Appl. No.: 16/827,577

(22) Filed: Mar. 23, 2020

(65) Prior Publication Data

US 2020/0315205 A1 Oct. 8, 2020

Related U.S. Application Data

(60) Provisional application No. 62/822,745, filed on Mar. 22, 2019.

(51) Int. Cl.
*A23G 9/22* (2006.01)
*A23G 9/04* (2006.01)
*A23G 9/50* (2006.01)
*B65D 85/60* (2006.01)

(52) U.S. Cl.
CPC ............ *A23G 9/221* (2013.01); *A23G 9/045* (2013.01); *A23G 9/503* (2013.01); *B65D 85/60* (2013.01)

(58) Field of Classification Search
CPC ........ B65D 43/02; B65D 43/06; B65D 43/08; B65D 85/60; B65D 43/0214; A23G 9/221; A23G 9/045; A23G 9/503; A23G 9/22
USPC ........ D7/523, 538, 540, 629, 630, 703, 511; D9/424, 425
See application file for complete search history.

(56) References Cited

U.S. PATENT DOCUMENTS

| | | | | |
|---|---|---|---|---|
| D20,118 S | * | 8/1890 | Pearson | D7/540 |
| D43,437 S | * | 1/1913 | Sanford | D9/546 |
| 1,280,422 A | * | 10/1918 | Dieterich | A21B 5/026 |
| | | | | 425/441 |
| D57,182 S | * | 3/1921 | Beiswanger | D7/540 |
| 1,794,238 A | * | 2/1931 | McKibben | A23G 9/506 |
| | | | | D7/672 |
| D166,179 S | * | 3/1952 | Dowd | D7/517 |
| D193,362 S | * | 8/1962 | Groff | D9/425 |
| 3,296,822 A | * | 1/1967 | Gram | A23G 9/083 |
| | | | | 426/515 |
| 3,337,077 A | * | 8/1967 | Wheaton, Jr. | A47G 19/26 |
| | | | | 206/525 |
| 3,526,335 A | * | 9/1970 | Swett | A47G 19/2255 |
| | | | | 215/377 |
| 3,734,276 A | * | 5/1973 | Bank | B65D 51/20 |
| | | | | 426/128 |
| 3,834,437 A | * | 9/1974 | Swett | A47J 43/20 |
| | | | | D7/672 |

(Continued)

*Primary Examiner* — Emmanuel S Luk
(74) *Attorney, Agent, or Firm* — Techlaw Ventures, PLLC; Terrence J. Edwards

(57) ABSTRACT

Food-grade shapers and serving containers for frozen confections are disclosed. A system of the disclosure includes a serving container and a shaping lid. The serving container includes a cup portion and a shaping portion, wherein the cup portion comprises a lower sidewall defining a cup cavity for receiving a shaved ice confection, and the shaping portion comprises an upper sidewall defining one or more shaping regions. The shaping portion includes a top rim defining a top-most portion of the serving container. The shaping lid is configured to removably connect to the serving container.

18 Claims, 11 Drawing Sheets

(56) References Cited

U.S. PATENT DOCUMENTS

| | | | | |
|---|---|---|---|---|
| 4,244,470 A | * | 1/1981 | Burnham | A23G 9/221 |
| | | | | 426/414 |
| D271,378 S | * | 11/1983 | Sun | D9/431 |
| 4,444,795 A | * | 4/1984 | Weinstein | B65D 85/78 |
| | | | | 426/123 |
| 4,471,880 A | * | 9/1984 | Taylor | B65D 43/0212 |
| | | | | 220/792 |
| D299,106 S | * | 12/1988 | Pomroy | D7/354 |
| 4,794,008 A | * | 12/1988 | Schmidt | B65D 81/3453 |
| | | | | 426/115 |
| 4,886,239 A | * | 12/1989 | Stimmel | F25C 1/243 |
| | | | | 220/555 |
| D305,616 S | * | 1/1990 | Johnson | D9/426 |
| D327,556 S | * | 6/1992 | Volker | D34/1 |
| 5,269,430 A | * | 12/1993 | Schlaupitz | B65D 43/162 |
| | | | | 220/4.23 |
| D409,911 S | * | 5/1999 | Guillin | D9/425 |
| 5,979,695 A | * | 11/1999 | Valls | B65D 85/78 |
| | | | | 220/666 |
| D449,965 S | * | 11/2001 | Liu | D7/566 |
| D477,969 S | * | 8/2003 | Griffin | D7/354 |
| D501,363 S | * | 2/2005 | Laib | D7/540 |
| D519,786 S | * | 5/2006 | Betras | D7/523 |
| D571,612 S | * | 6/2008 | Wood | D7/523 |
| D640,496 S | * | 6/2011 | Lam | D7/325 |
| D644,064 S | * | 8/2011 | DuBois | D30/129 |
| D679,545 S | * | 4/2013 | Wolhendler | D7/510 |
| 9,078,535 B1 | * | 7/2015 | Buck | B65D 43/169 |
| 9,272,444 B2 | * | 3/2016 | Zorovich | B29C 33/405 |
| 9,303,910 B2 | * | 4/2016 | Villalobos | F25C 1/22 |
| D766,050 S | * | 9/2016 | Inoue | D7/677 |
| D792,160 S | * | 7/2017 | Ng | D7/538 |
| 9,723,856 B2 | * | 8/2017 | Inoue | A23G 9/221 |
| 9,826,753 B2 | * | 11/2017 | Inoue | A23G 9/04 |
| D804,909 S | * | 12/2017 | Cotnoir | D7/532 |
| D811,169 S | * | 2/2018 | Yao | D7/532 |
| 10,039,422 B2 | * | 8/2018 | Fouad | A47J 43/27 |
| D830,796 S | * | 10/2018 | Chen | D7/703 |
| D852,583 S | * | 7/2019 | Tomalia | D7/530 |
| 10,357,053 B2 | * | 7/2019 | Vanneste | A47J 43/20 |
| D856,753 S | * | 8/2019 | Yildiz | D7/509 |
| D866,263 S | * | 11/2019 | Franco | D7/518 |
| D872,572 S | * | 1/2020 | Grill | D7/703 |
| D873,132 S | * | 1/2020 | Grill | D7/703 |
| D877,612 S | * | 3/2020 | Grill | D7/703 |
| D878,841 S | * | 3/2020 | Bergström | D7/300.1 |
| 10,638,888 B1 | * | 5/2020 | Barnes | A47J 47/16 |
| D891,918 S | * | 8/2020 | Chen | D9/425 |
| D897,162 S | * | 9/2020 | Farid | D7/629 |
| D963,411 S | * | 9/2022 | Li | D7/510 |
| 2002/0022074 A1 | * | 2/2002 | Tomlinson | A47J 43/00 |
| | | | | 426/112 |
| 2002/0175171 A1 | * | 11/2002 | Stewart | B65D 21/0219 |
| | | | | 220/4.24 |
| 2008/0128312 A1 | * | 6/2008 | Carpenter | A45C 11/20 |
| | | | | 206/545 |
| 2008/0145489 A1 | * | 6/2008 | Green | B65D 85/78 |
| | | | | 426/112 |
| 2010/0018969 A1 | * | 1/2010 | Marks | B65D 43/162 |
| | | | | 220/361 |
| 2013/0068774 A1 | * | 3/2013 | Buck | A47G 19/30 |
| | | | | 220/521 |
| 2013/0156918 A1 | * | 6/2013 | Reinhardt | A23G 9/221 |
| | | | | 426/515 |
| 2014/0030390 A1 | * | 1/2014 | Coyle | B65D 43/0212 |
| | | | | 426/123 |
| 2014/0065267 A1 | * | 3/2014 | Albano | A23G 9/503 |
| | | | | 426/280 |
| 2014/0299601 A1 | * | 10/2014 | Schiavone | B65D 43/0229 |
| | | | | 220/288 |
| 2015/0366236 A1 | * | 12/2015 | Inoue | B65D 51/18 |
| | | | | 249/177 |

* cited by examiner

FOOD-GRADE SHAPER AND CONTAINER FOR FROZEN CONFECTIONS

CROSS-REFERENCE TO RELATED APPLICATION

This application claims the benefit of U.S. Provisional Patent Application No. 62/822,745, filed Mar. 22, 2019, titled "SYSTEM, METHOD, AND DEVICE FOR PROVIDING A SHAVED-ICE CONFECTION READY-FOR-CONSUMPTION," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates generally to food-grade containers and particularly to serving containers for frozen confections.

BACKGROUND

Frozen confections, such as shaved ice or snow cones, are increasingly popular desserts. Frozen confections are made by shaving ice with a specialized machine capable of creating a snow-like ice-based dessert. A wide variety of toppings and flavored syrups may be added to the frozen confection. Frozen confections are typically prepared fresh by shaving ice into a serving container and then providing the frozen confection to a customer shortly after production.

Serving containers for frozen confections are typically disposable and made of plastic, paper, foam, or a biodegradable material. Most commonly, the serving container for a frozen confection is a simple cup that could be used for a beverage, having a flat bottom and a sidewall that defines a cavity. When the serving container is a traditional beverage cup, the serving container is not likely to entice customers to purchase a frozen confection based on the novelty of the dessert or the serving container. In some instances, it is desirable to provide a frozen confection in a specialized serving container capable of molding the shaved ice into a unique shape.

In light of the foregoing, disclosed herein are systems, methods, and devices for shaping a frozen confection and delivering a frozen confection in a specialized serving container.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
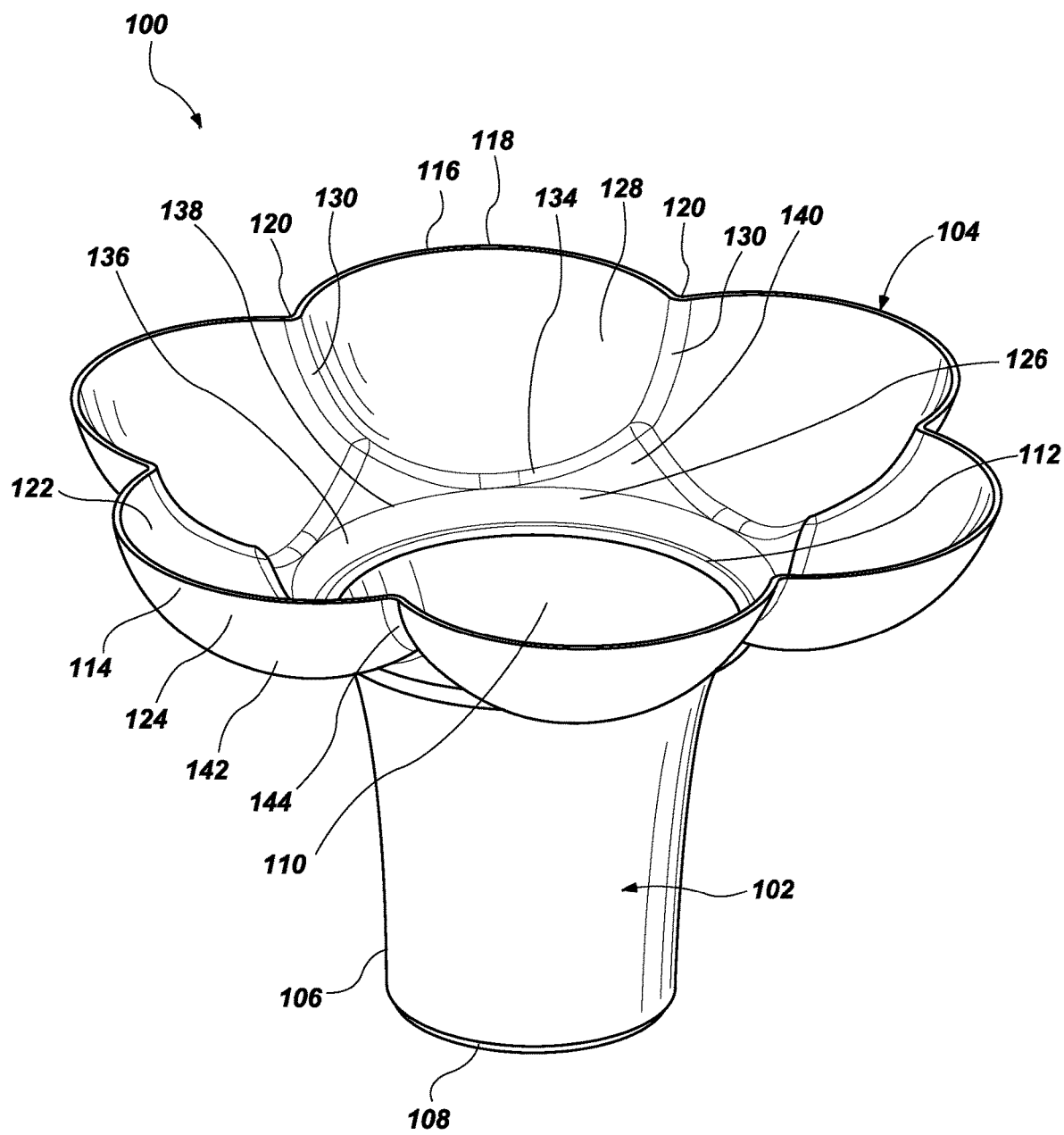
FIG. 1 illustrates a perspective view of a serving container for holding a frozen confection.

Disclosed herein are systems, methods, and devices for shaping a frozen confection and delivering a frozen confection in a specialized serving container. A device of the disclosure is a system for holding, storing, and providing a frozen confection dessert. In an embodiment, the system includes a serving container for holding shaved ice and a corresponding shaping lid for shaping the shaved ice. The shaping lid is removably attached to the serving container. The combination of the serving container and the shaping lid can form the shaved ice into a unique shape such as a symbol, a caricature, an animal, or some other object.

The food-grade serving containers and shapers disclosed herein can be particularly useful for serving frozen confections. Frozen confections, such as shaved ice or snow cones, are increasingly popular desserts. Frozen confections are made by shaving ice with a specialized machine capable of creating a snow-like ice-based dessert. In some embodiments, the frozen confection is made by ejecting shaved ice from an ice shaving machine directly into a serving container. Traditional serving containers for frozen confections are disposable and made of plastic, paper, foam, or a biodegradable material. Typically, the serving container is a traditional cup with a flat bottom and a sidewall that defines a cavity. The frozen confection is ejected out of the ice shaving machine and directly into the cup, and then the cup is filled slightly past the rim to provide the customer with additional shaved ice. When the frozen confection is provided in a traditional cup, the cup itself is not typically a selling factor to entice customers to purchase the frozen confection. Therefore, there is a need for specialized serving containers for frozen confections that increase the likelihood that customers will purchase the frozen confection.

In some instances, in traditional systems, the shaved ice is formed into a dome shape with a shaper. In traditional systems, the shaper may be a separate device or may be a part of the ice shaving machine. Typically, the shaper is not provided to the customer. The shaper may have a concave shape configured for forming the shaved ice above the rim of the cup into a dome shape. Again, this traditional configuration does not entice customers to purchase the frozen confection based on the aesthetics of the frozen confection itself or the serving container. Further still, this traditional configuration causes the frozen confection to have a single dome. When the frozen confection has a single dome, it is difficult for a consumer to use different toppings and flavored syrups without the different toppings and flavored syrups intermixing with one another. For some consumers, it is desirable to partition the frozen confection into different areas with different toppings and flavorings.

Further, another drawback to the traditional systems, wherein a frozen confection is presented in a traditional cup with a single dome, is that multiple persons cannot share the frozen confection without intermixing their desired toppings and flavorings. Often, multiple people will share a single frozen confection. Each of the multiple people may desire a different flavoring or topping on the frozen confection. When the frozen confection is presented in a traditional cup with a single shaped dome, the multiple people cannot each have their own desired topping without the flavorings and toppings intermixing with one another. Using the traditional serving containers and shapers, multiple flavors will be poured onto the single dome. Inevitably, this technique leads to a person consuming a flavor of syrup that he or she did not order. Or, even worse yet, the person ends up consuming an unsavory mix of flavors. Moreover, due to the limited portion sizes of previously available containers, persons were left wanting more shaved ice.

In an embodiment, a frozen confection is provided in a food-grade serving container that serves to hold the frozen confection and also shape the frozen confection into a unique shape. It should be appreciated that the frozen confection could be shaped into a variety of different unique shapes, depending on the shape of the serving container. For example, the serving container could include shaping components for shaping the frozen confection into a flower shape, an animal shape, a movie or television character shape, an alphanumeric shape, a logo shape, a team logo shape, and so forth. In an embodiment, the shaping components of the serving container cause the frozen confection to be shaped in a configuration that provides multiple different "partitions" of shaved ice such that a consumer could apply different toppings or flavorings to each of the different partitions without risking that the different toppings or flavorings will intermix with one another.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles, or the like which has been included in the present specification is not to be taken as an admission that any or all of these matters form part of the prior art base, or were common general knowledge in the field relevant to the disclosure as it existed before the priority date of each claim of this application.

Before the methods, systems and devices for producing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "having," "comprising," "including," "containing," "characterized by," and grammatical equivalents thereof are inclusive or open-ended terms that do not exclude additional, unrecited elements or method steps.

As used herein, the term "shaved ice" refers broadly to the large family of ice-based desserts or confections made from the shavings of ice or crushed ice, including snow cones, frozen confections, and shaved ice. It will be appreciated that shaved ice may often include a flavoring that may be a syrup or other sweetened condiment that is added to the shaved ice. Similarly, the terms "ice shaving" in reference to a machine are intended broadly to include all machines used to make or produce the large family of ice-based desserts or confections that may be classified as shaved ice or snow cone products.

In this disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Figure 2:
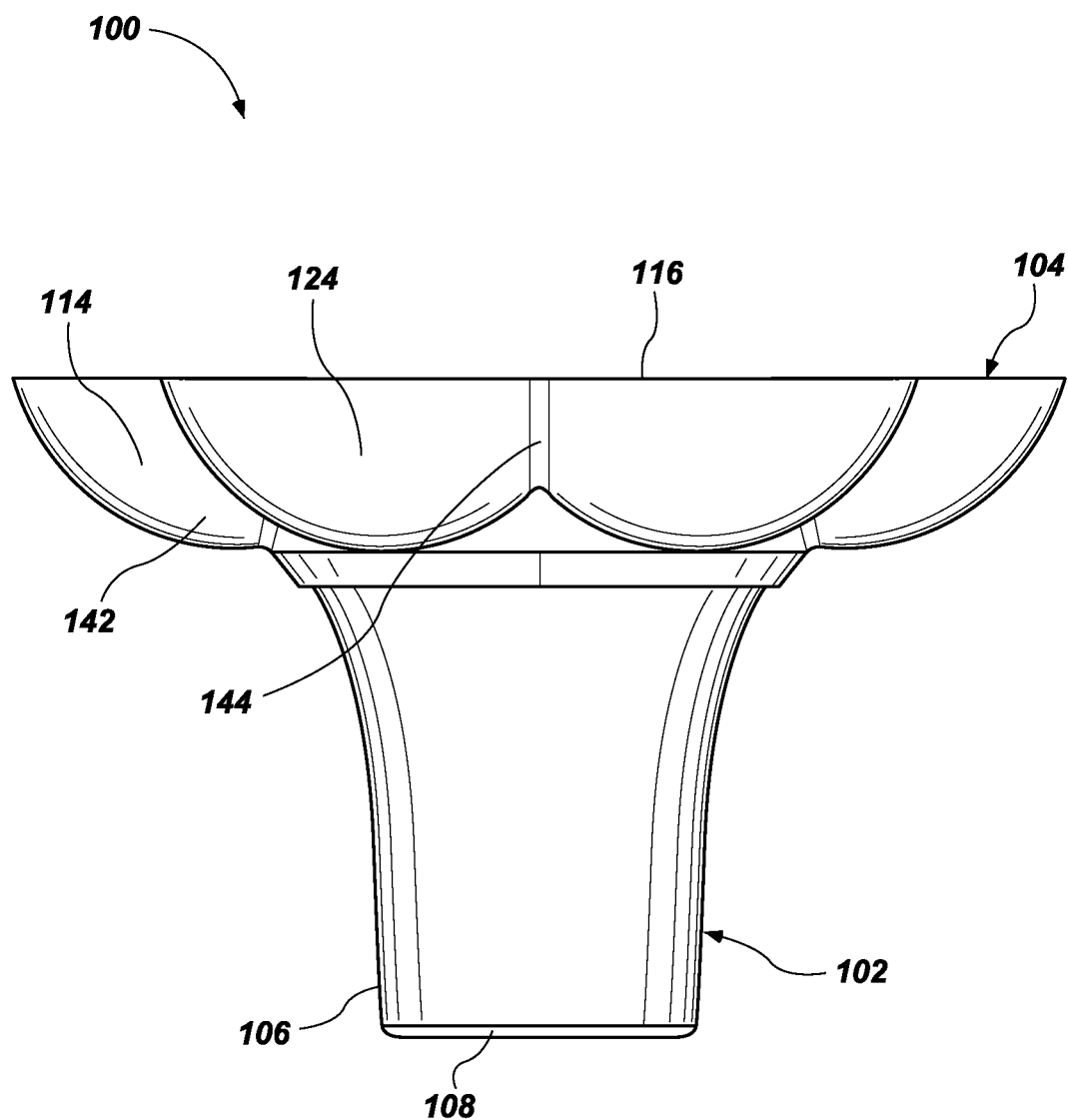
FIG. 2 illustrates a straight-on side view of a serving container for holding a frozen confection.
Figure 3:
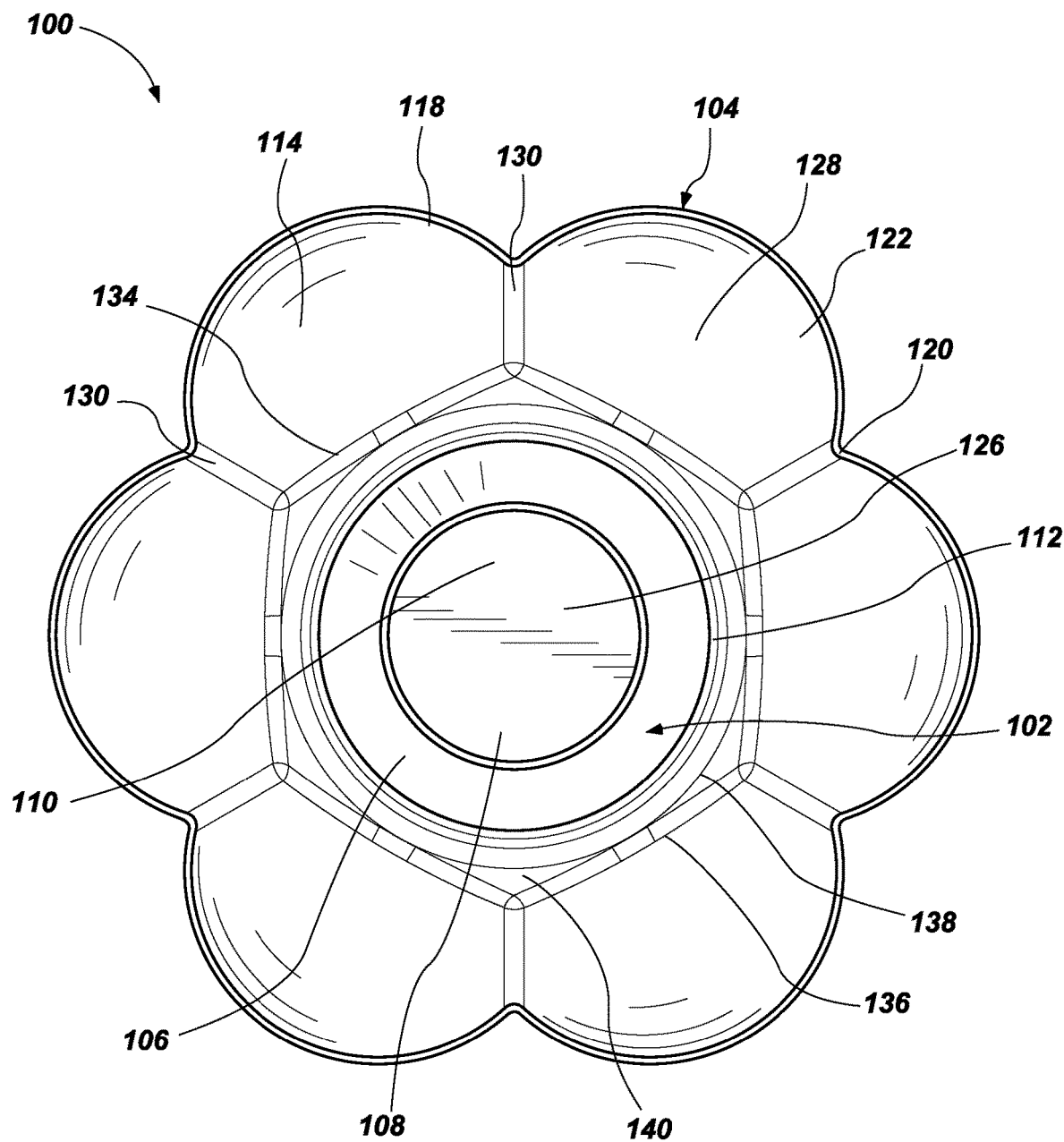
FIG. 3 illustrates a top aerial view of a serving container for holding a frozen confection.
Figure 4:
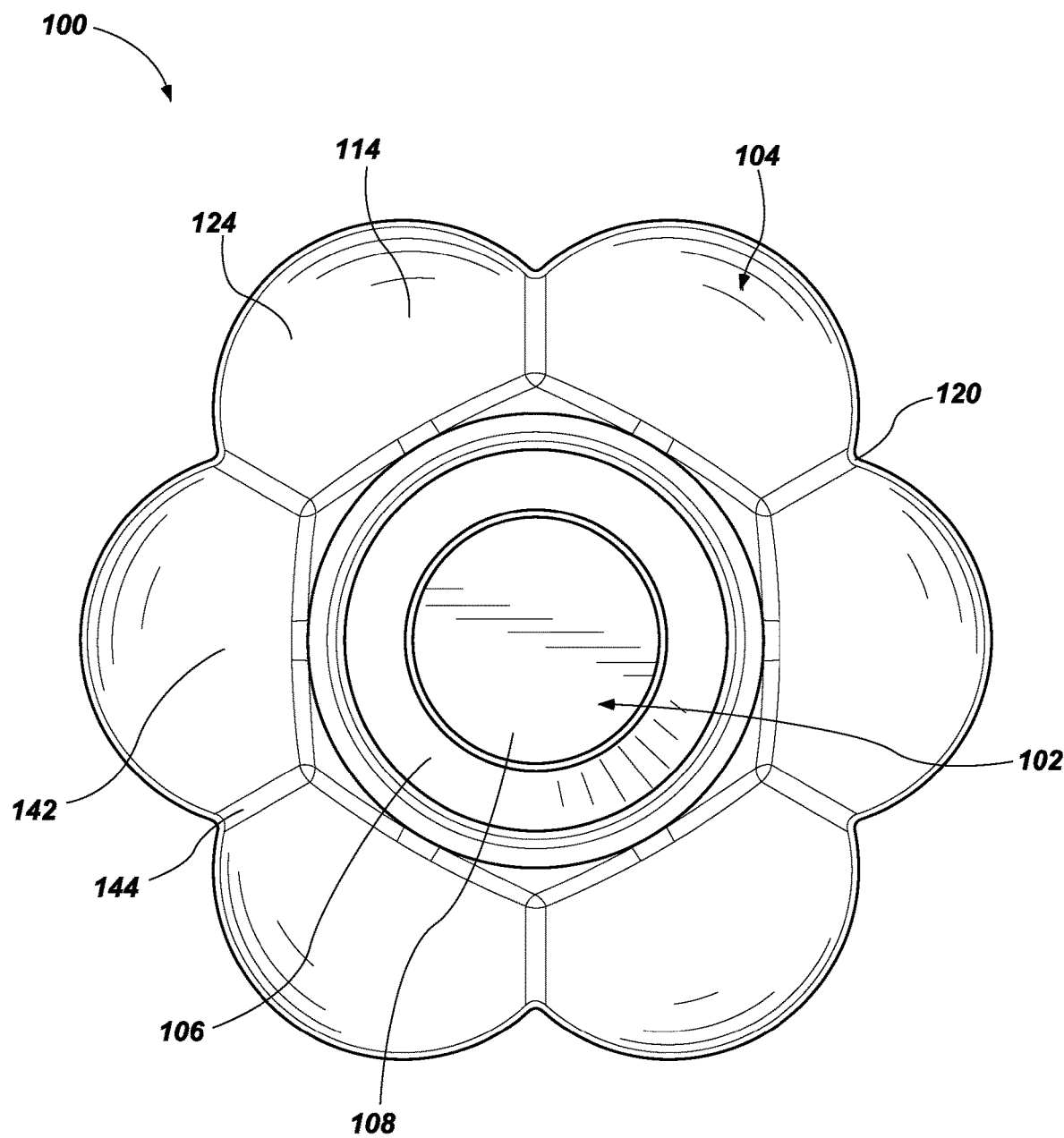
FIG. 4 illustrates a bottom aerial view of a serving container for holding a frozen confection.

Referring now to FIGS. 1-4, wherein like reference numerals refer to like components, there is depicted a serving container 100 for a shaved ice confection. FIG. 1 illustrates a perspective view of a serving container 100, wherein the perspective view illustrates a top portion of the serving container 100 and a cup cavity 100 disposed within the serving container 100. FIG. 2 illustrates a straight-on side view of the serving container 100. FIG. 3 illustrates an top-down aerial view of the serving container 100 that illustrates the inner cup cavity 110 disposed within the cup portion 102 of the serving container 100. FIG. 4 illustrates bottom-down aerial view of the serving container 100 that illustrates the bottom 108 of the serving container 100, wherein the bottom 108 represents the lower portion of the serving container 100 when the serving container 100 is standing in an upright orientation.

The serving container 100 is configured to receive shaved ice that has been processed by an ice shaving machine. The serving container 100 may be a unitary piece molded from plastic by an injection molding process. The serving container 100 includes a cup portion 102 and a shaping portion 104. The embodiments illustrated herein, including the embodiments illustrated in FIGS. 1-9 are exemplary only and should not be seen as limiting on this disclosure.

In an embodiment, the shaping portion 104 of the serving container 100 forms a bottom half of a flower-like shape, as illustrated in FIGS. 1-4 and 9-10. The corresponding shaping lid 200 (illustrated in FIGS. 5-9) is configured to be pressed down onto the serving container 100 to shape the shaved ice into a unique shape. In an embodiment, the shaping lid 200 forms the bottom half of the same flower-like shape formed by the serving container 100, as illustrated in FIGS. 5-9. It should be appreciated that the serving container 100 and the shaping lid 200 may form any suitable shape, and that the flower-like shape illustrated in FIGS. 1-9 is not limiting and is merely a single implementation of the disclosure.

In an embodiment, the serving container 100 and the shaping lid 200 form a character, such as a fictional character from movies or television or a non-fictional character. In such an embodiment, when shaved ice is deposited into the serving container 100, and the shaping lid 200 is pressed on to the shaved ice, the shaved ice will also form the shape of the character. In such an embodiment, the shaping portion 104 may form the bottom half of a head, for example, and the corresponding shaping lid 200 may form the top half of the head including the facial features. When the shaved ice is deposited in the serving container 100, and the shaping lid 200 is pressed on to the shaved ice, the shaved ice will then be formed into the shape of the head with the facial features constructed out of the pressed shaved ice. In an embodiment, the shaved ice is pressed into the form of a cartoon character, such as a cartoon character from movies or television.

In an embodiment, the serving container 100 and the shaping lid 200 form a logo, such as the logo of a business, an athletic team, a school, an organization, a family crest, or some other entity. In an embodiment, the serving container 100 and the shaping lid form a unique shape, such as an animal, a plant, a building structure, a work of art, and so forth. It should be appreciated that the serving container 100 and the shaping lid 200 may be configured to form any suitable shape. A different shape may be desirable in different implementations. For example, if frozen confections are being served at a theme park, it may be desirable for the serving container 100 and the shaping lid 200 to form the shape of a roller coaster, a ride, a cartoon character, or some other entity associated with theme park. Further for example, if frozen confections are being served at an athletic event, it may be desirable for the serving container 100 and the shaping lid 200 to form the shape of a specific sports ball, a team logo, a symbol of a country or other entity, and so forth.

In an embodiment, the shaping portion 104 of the serving container 100 is the bottom half of a desired shape, and the shaping lid 200 is the top half of the desired shape. When a frozen confection is deposited into the serving container 100, the frozen confection is piled up past the upper rim of the serving container 100. Then, the shaping lid 200 may be pressed down onto the frozen confection until the shaping lid 200 meets the top rim of the serving container 100 and/or locks on the serving container 100 in some fashion. Then, when the shaping lid 200 is removed, the frozen confection will be formed into the desired shape. The frozen confection may additionally include details imprinted into the surface of the shaved ice that are located on the inner surface of the shaping lid 200 and then pressed into the shaved ice. It should be appreciated that the serving container 100 and the shaping lid 200 as discussed herein may be formed in any suitable shape.

Referring again to FIGS. 1-4, the cup portion 102 of the serving container 100 may include a lower sidewall 106 extending upwardly from a bottom 108 to define a cup cavity 110 for holding a frozen confection. The lower sidewall 106 is defined as being "lower" with respect to the upper sidewall 114 of the shaping portion 104 when the serving container 100 is standing in an upright position. The cup cavity 110 may be substantially cylindrical in shape. It will be appreciated that the cup portion 102 may be generally formed in the shape of a cup such that it may stand upright on the bottom 108 and so that the serving container 100 may be easily held by a user. In an embodiment, the cup portion 102 may be cone shaped such that the cup cavity 110 is cone shaped. The cup portion 102 may extend from the bottom 108 to an intermediate rim 112.

The shaping portion 104 may include an upper sidewall 114 that extends upwardly from the intermediate rim 112 of the cup portion 102 to a top rim 116 of the serving container 100. The top rim 116 may include a plurality of shaping rim portions 118. The shaping rim portions 118 define the outer rim of a desired shape formed by the shaping portion 104. In an embodiment, the shaping rim portions 118 align with a corresponding bottom rim on the shaping lid 200. Interposed between adjacent shaping rim portions 118 may be a cusp 120. It will be appreciated that the cusps 120 are the points on the top rim 116 where two adjacent shaping rim portions 118 meet. In the example implementation illustrated in FIG. 1-4, the shaping rim portions 118 form the outline of six petals in a flower-like shape. It should be appreciated that the shaping portion 104, and further the shaping rim portions 118, may form any suitable shape. In an embodiment, the shaping rim portions 118 form the outline of a face, a logo, a cartoon character, and so forth. The example implementation illustrated in FIGS. 1-4 is a single embodiment of the disclosure and is non-limiting.

The upper sidewall 144 defines an upper cavity 126. The upper cavity 126 is a space located above the cup cavity 110 when the serving container 100 is standing in an upright orientation. The space defined by the upper sidewall 144 (i.e., the upper cavity 126) is interconnected with the space fined by the lower sidewall 106 (i.e., the cup cavity 110). When shaved ice is deposited in the serving container 100, the shaved ice is first deposited into the cup cavity 110 and then into the upper cavity 126. The upper sidewall 114 of the shaping portion 104 has an interior surface 122 and an exterior surface 124. The interior surface 122 defines the interior space where a frozen confection may be deposited therein. In an embodiment, the interior surface 122 includes ribbing or details extending out from the interior surface, such that the details will be pressed into the shaved ice when the shaved ice is deposited in the serving container 100. The upper cavity 126 and the cup cavity 110 are interconnected.

The interior surface 122 of the shaping portion 104 may include a plurality of shaping regions 128 that encircle the cup cavity 110 of the cup portion 102. In the example implementation illustrated in FIGS. 1-4, there are six shaping regions 128 that each look like the bottom half of a petal in a six-petal flower-like structure. It should be appreciated that this implementation is exemplary only, and that the shaping regions 128 may be in any suitable shape. In an example embodiment, the top rim 116 defines the shape of a cartoon mouse with two ears, and the serving container 100 includes two shaping regions 128, i.e., one shaping region 128 for each of the cartoon mouse's ears. In an embodiment, the serving container 100 may include at least four, at least five, at least six, at least seven, or at least eight shaping regions disposed around the cup cavity 110. In an embodiment, the serving container 100 may include between four and eight concave regions, between five and seven shaping regions, or six concave shaping disposed around the cup cavity 110.

The top rim 116 may define an upper limit of the shaping regions 128. For example, one of the shaping rim portions 118 of the top rim 116 may form an upper limit for each of the shaping regions 128 of the interior surface 122 of the shaping portion 104. A lateral ridge 130 may be formed on the interior surface 122 between adjacent shaping regions 128. That is, the lateral ridges 130 may separate the shaping regions 128 from each other. A lower ridge 134 may be disposed between each of the shaping regions 128 and the intermediate rim 112 of the cup portion 102. The lateral ridges 130 and the lower ridge 134 may be saddle-shaped ridges.

The interior surface 122 further comprises an annular surface 136 extending upwardly from the intermediate rim 112 to a transition rim 138. The annular surface 136 tapers outwardly from the intermediate rim 112 to form a funnel to direct shaved ice into the cup cavity 110 of the cup portion 102. Formed between adjacent lower ridges 134 and the transition rim 138 are interconnecting surfaces 140. The interconnecting surfaces 140 are substantially triangular in shape and may be slightly tapered to direct shaved ice into the cup cavity 110.

The exterior surface 124 of the upper sidewall 114 may include a plurality of bulbous regions 142. Interposed between each of the adjacent ones of the plurality of bulbous regions 142 is a groove 144. It will be appreciated that the bulbous regions 142 are formed opposite the shaping regions 128 and the grooves 144 are formed opposite the lateral ridges 130. Again, it should be appreciated that the quantity and shape of the bulbous regions 142 is dependent on the desired shape created by the serving container 100 in connection with the shaping lid 200.

Figure 5:
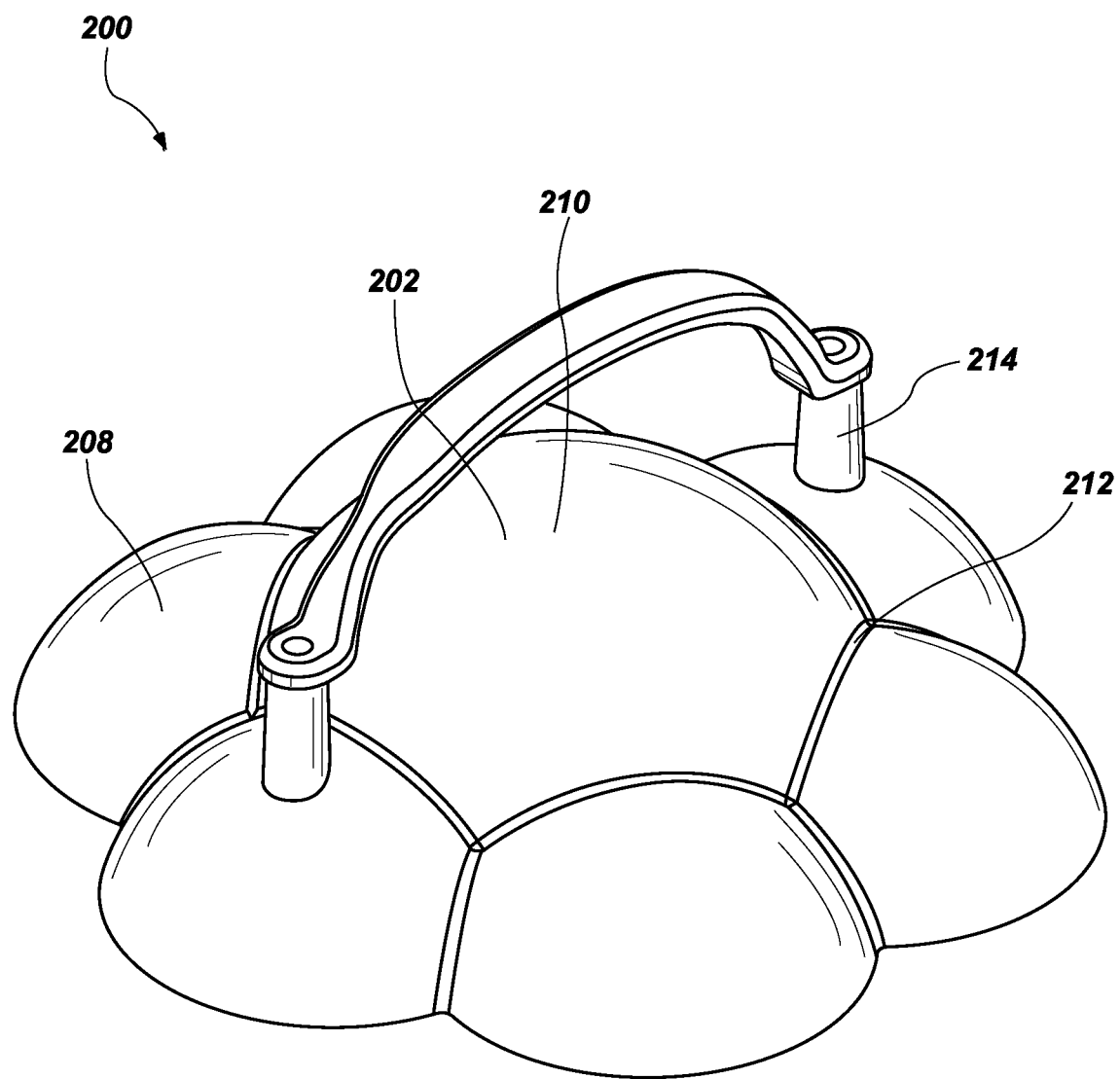
FIG. 5 illustrates a perspective view of a shaping lid for use in connection with a serving container for holding a frozen confection.
Figure 6:
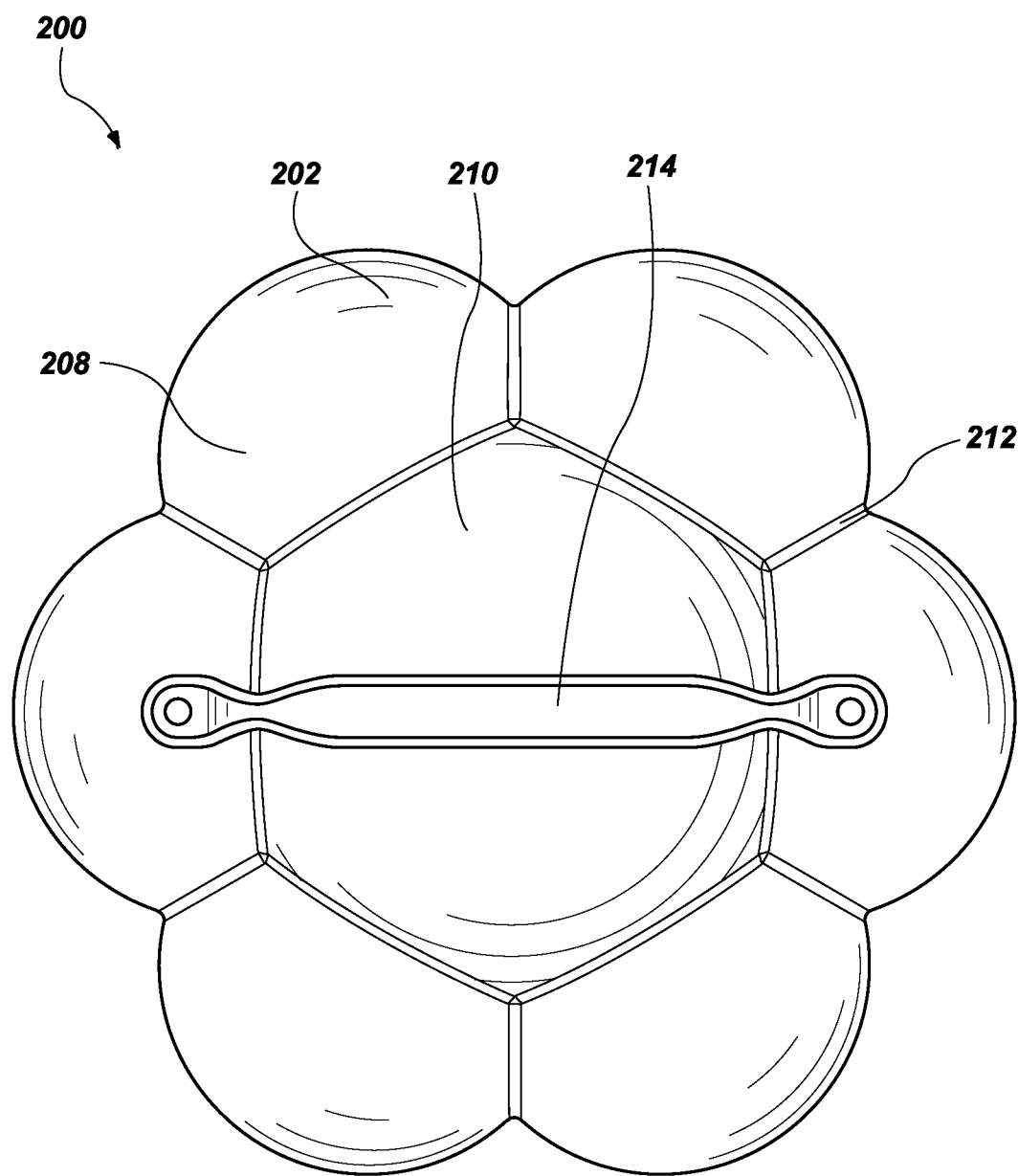
FIG. 6 illustrates a top aerial view of a shaping lid for use in connection with a serving container for holding a frozen confection.
Figure 7:
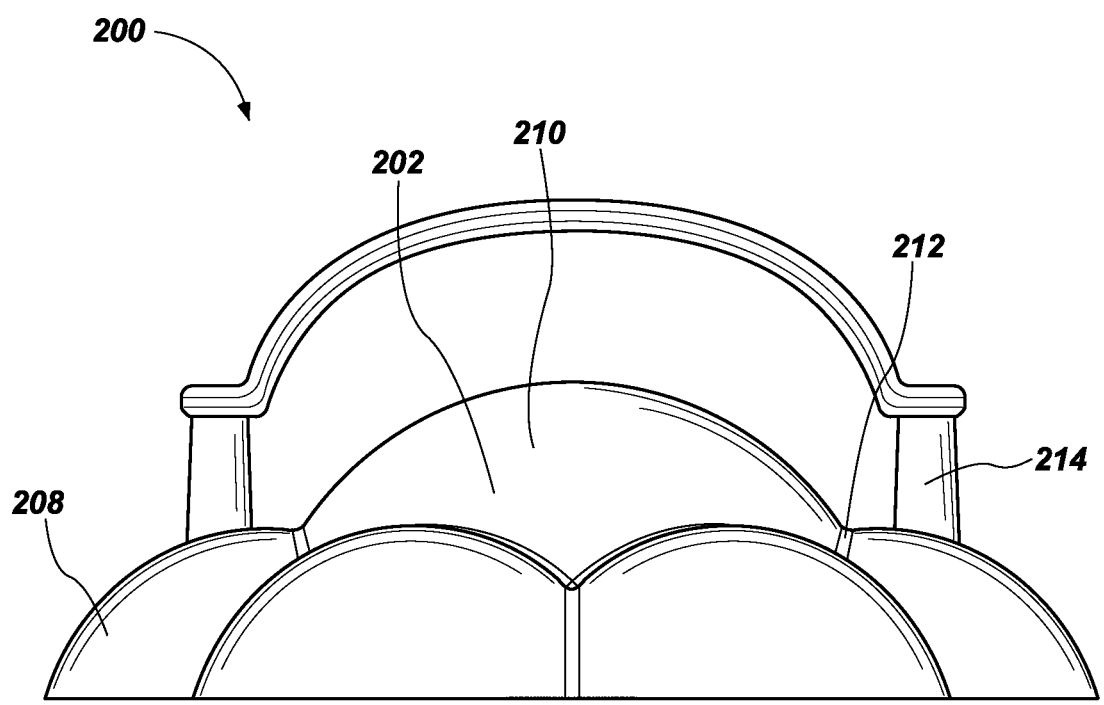
FIG. 7 illustrates a straight-on side view of a shaping lid for use in connection with a serving container for holding a frozen confection.
Figure 8:
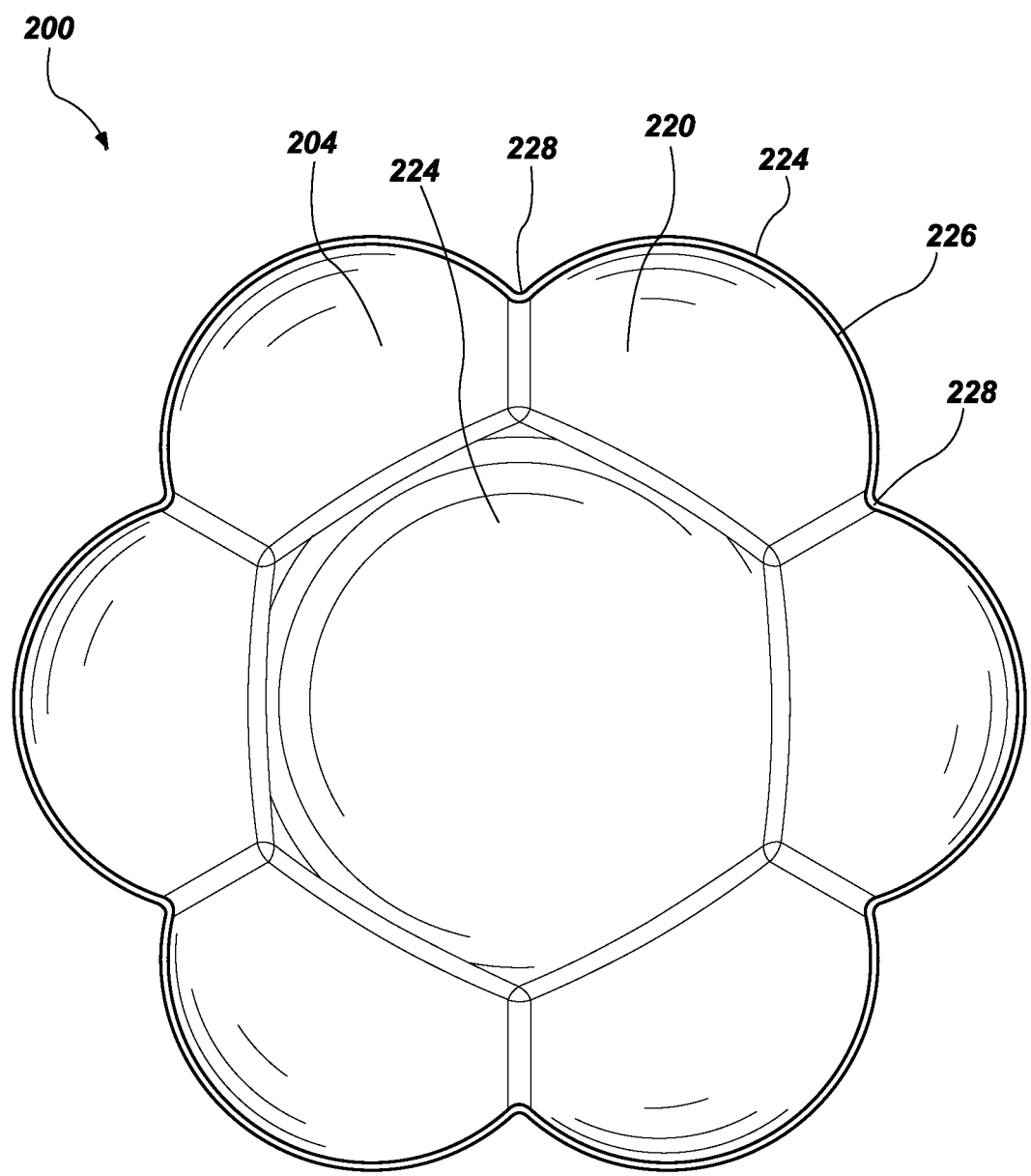
FIG. 8 illustrates a bottom aerial view of a shaping lid for use in connection with a serving container for holding a frozen confection.

Referring to FIGS. 5-8, there is depicted a shaping lid 200 for shaping the top of shaved ice in the serving container 100. FIG. 5 illustrates a perspective view of the shaping lid 200. FIG. 6 illustrates a top-down aerial view of the shaping lid 200 illustrating the top surface 202 of the shaping lid 200. FIG. 7 illustrates a straight-on side view of the shaping lid 200. FIG. 8 illustrates a bottom-down aerial view of the shaping lid 200 illustrating the ice-shaping surface 204 of the shaping lid 200. The ice-shaping surface 204 of the shaping lid 200 is the surface that comes in contact with shaved ice when shaved ice is disposed within the serving container 100 and the shaping lid 200 is then depressed on to the shaved ice to close the serving container 100.

The shaping lid 200 and the serving container 100 may form a two-piece serving system for providing shaved ice with a shaped-top surface to consumers at the point-of-sale. The shaping lid 200 may be a unitary piece formed by injection molding. The shaping lid 200 may be formed from plastic or some other rigid material. The shaping lid 200 may comprise a top surface 202 and an ice-shaping surface 204 opposite the top surface 202. When the shaping lid 200 is pressed onto shaved ice that is disposed within the serving container 100, the ice-shaping surface 204 will come in contact with the shaved ice. The shaping lid 200 may include a handle 214 for receiving a hand of a user.

The top surface 202 may comprise a plurality of lid shaping regions 208 surrounding a central lid shaping region 210. That is, the plurality of lid shaping regions 208 may be arranged around the central lid shaping region 210. The plurality of lid shaping regions 208 may be smaller than the central lid shaping region 210. Grooves 212 may run in between the plurality of lid shaping regions 208 and the central lid shaping region 210. Pilons 214 connected to the handle 214 may extend upwardly from the top surface 202.

In the example implementation illustrated in FIGS. 5-8, the shaping lid 200 includes six lid shaping regions 208 formed in a petal-like shape, and the totality of lid shaping regions 208 form a flower-like shape. In this example implementation, the lid shaping regions 208 cause shaved ice disposed within the serving container 100 to also have a petal-like shape such that when the shaping lid 200 is removed, the shaved ice will still be formed into a flower-like shape. It should be appreciated that the lid shaping regions 208 may be in any suitable shape or size depending on the desired shape of the shaved ice.

In an example implementation, the shaping lid 200 is formed in the shape of a cartoon mouse with two ears. In such an implementation, the shaping lid 200 may include two lid shaping regions 208 each in the shape of a mouse ear. In a further example implementation, the shaping lid 200 and the serving container 100 are in the shape of a company logo or trademark. In such an embodiment, the lid shaping regions 208 may form different extensions or shapes that form the company logo or trademark. The lid shaping regions 208 may form portions of letters, numbers, symbols, figures, facial features, and so forth. It should be appreciated that the shaping lid 200 and the lid shaping regions 208 may have any suitable shape.

As seen in FIG. 8, the ice-shaping surface 204 may include a plurality of concave regions 220 and a central concave region 222. The plurality of concave regions 220 may be disposed around the central concave region 222. The central concave region 222 may be larger than the plurality of concave regions 220. The shaping lid 200 may comprise a bottom rim 224. The bottom rim 224 may have a plurality of convex regions 226. Disposed between adjacent ones of the plurality of convex regions 226 are cusps 228. In the example implementation illustrated in FIG. 8, the plurality of concave regions 220 form petal-like shapes such that the shaved ice will appear like a flower with multiple petals, after the shaping lid 200 is depressed on the shaved ice and then removed. It should be appreciated that the ice-shaping surface 204 may include concave regions, flat regions, and convex regions. The number of concave, flat, and convex regions within the shaping lid 200 is dependent on the desired final shape of the shaping lid 200 and the serving container 100.

In an embodiment, the ice-shaping surface 204 includes surface reliefs for imprinting details in the shaved ice. In an embodiment, the ice-shaping surface 204 includes depressions (may be referred to as low reliefs) within the ice-shaping surface 204. A depression in the ice-shaping surface 204 will cause the shaved ice to have a raised design after the shaping lid 200 has been depressed on to the shaved ice. In an embodiment, the ice-shaping surface 204 includes elevations (may be referred to as high reliefs) within the ice-shaping surface 204. An elevation on the ice-shaping surface 204 will cause the shaved ice to have a depressed design after the shaping lid 200 has been depressed on to the shaved ice. The reliefs may include designs, details for a caricature of an animal, person, cartoon, or other object, details for a logo or trademark, numbers, letters, words, and so forth. When the shaping lid 200 is depressed on shaved ice, the reliefs will be pressed against the shaved ice and cause the shaved ice to adopt the imprinted details.

In an example embodiment, the serving container 100 and the shaping lid 200 cause shaved ice to adopt the shape of a flower with multiple petals (as illustrated in FIGS. 1-9). In such an embodiment, the ice-shaping surface 204 may include reliefs for details in the petals, the center of the flower, and so forth. Additionally, the ice-shaping surface 204 may include personalized reliefs indicating, for example, a name, an address, a message, and so forth. It should be appreciated that the reliefs may take any suitable form.

In an example embodiment, the serving container 100 and the shaping lid 200 cause shaved ice to adopt the shape of a cartoon character. In such an embodiment, the ice-shaping surface 204 may include reliefs for details in the cartoon character, such as eyes, nose, mouth, and hair details that add to the complexity and realistic nature of the shaved ice. In such an embodiment, shaved ice is deposited into the serving container 100 above the top rim 116 and the shaping lid 200 is then depressed against the overflowing shaved ice. When the shaping lid 200 is removed, the shaved ice will have adopted the shape of the ice-shaping surface 204, include any reliefs imprinted in the ice-shaping surface 204. In this example embodiment, the shaved ice will then look like the cartoon character, including any details such as eyes, nose, mouth, and hair details that have been imprinted into the shaved ice by the reliefs in the ice-shaping surface 204.

Figure 9:
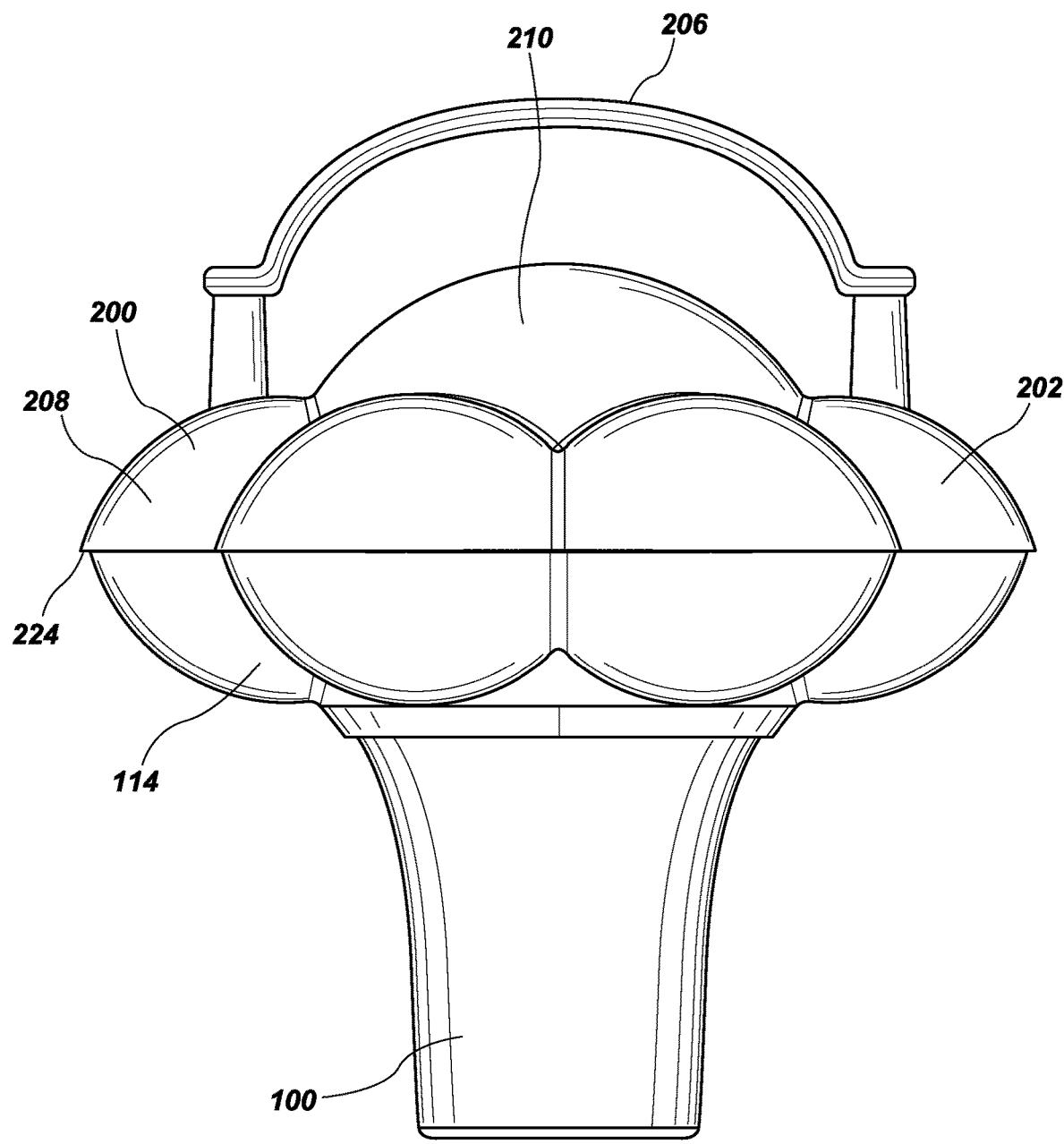
FIG. 9 illustrates a perspective view of a system for holding a frozen confection, wherein the system includes a serving container and a shaping lid that is removably connected to the serving container.

FIG. 9 is a straight-on view of a system comprising the serving container 100 and the shaping lid 200. FIG. 9 illustrates that the shaping lid 200 can be depressed against the serving container 100. In an embodiment, shaved ice is deposited in the serving container 100 and the shaping lid 200 then covers the shaved ice.

In an embodiment, the shaping lid 200 is locked on the serving container 100 by some locking means. The locking means may include a latch, a snap, or some other means. In such an embodiment, the shaping lid 200 is then locked on to the serving container 100 such that a person may lift the system by the handle 206 and thereby carry the frozen confection dessert without the shaping lid 200 separating from the serving container 100.

Figure 10:
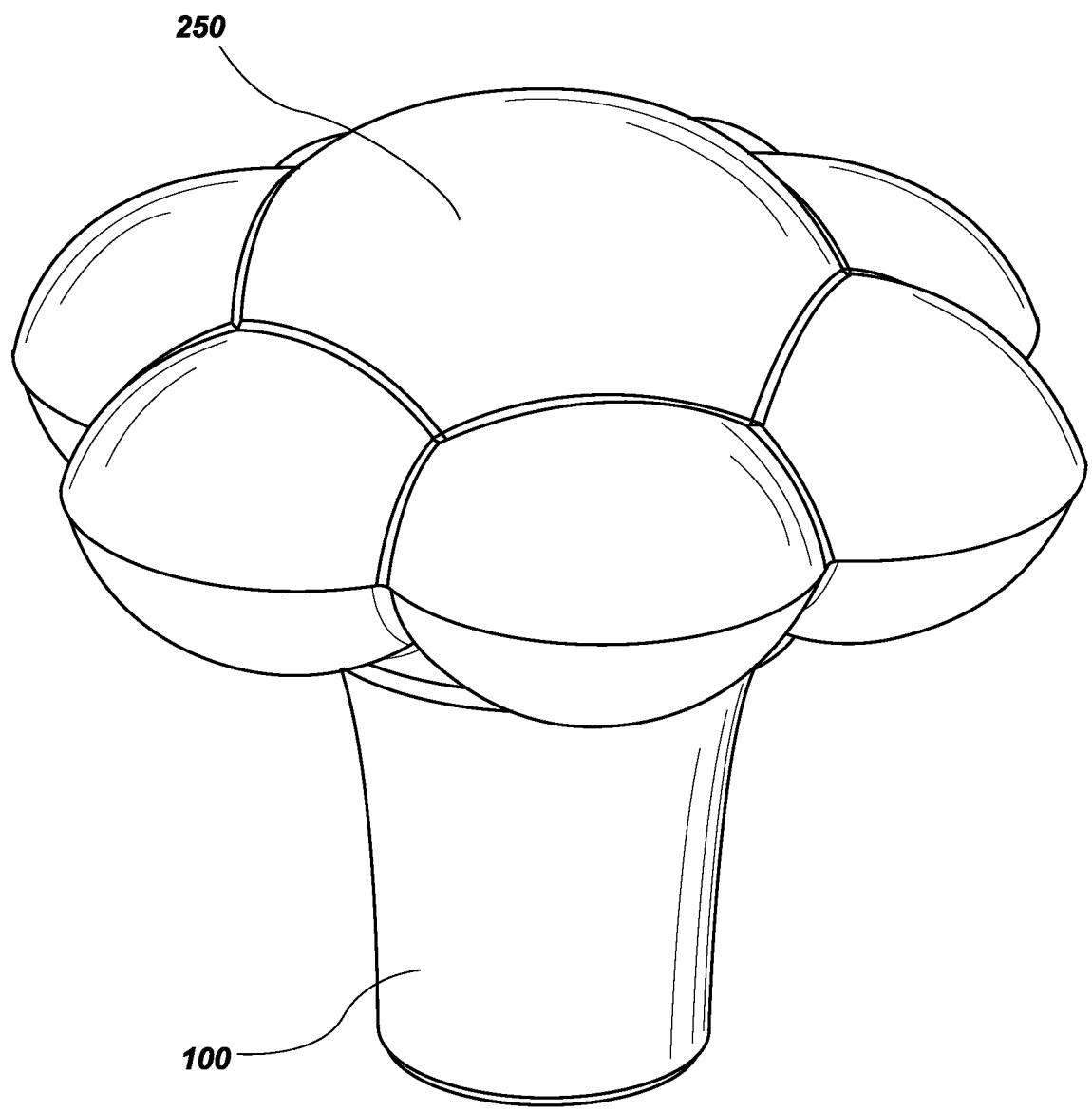
FIG. 10 illustrates a perspective view of a serving container with shaved ice disposed therein, wherein shaved ice is shaped according to the ice-shaping surface of a shaping lid, and the shaping lid has been removed.

FIG. 10 illustrates a perspective view of a serving container 100 filled with shaved ice 250, wherein the shaved ice 250 has been imprinted with the shape of a corresponding shaping lid 200, such as the shaping lid 200 illustrated in FIGS. 5-9. In such an embodiment, the serving container 100 is filled with shaved ice past the top rim 116 of the serving container 100. The shaping lid 200 is then depressed on the shaved ice such that the shaved ice takes upon itself the shape and texture details of the ice-shaping surface 204 of the shaping lid 200. When the shaping lid 200 is removed, as shown in FIG. 10, the shaved ice will still take on the shape of the shaping lid 200.

Figure 11:
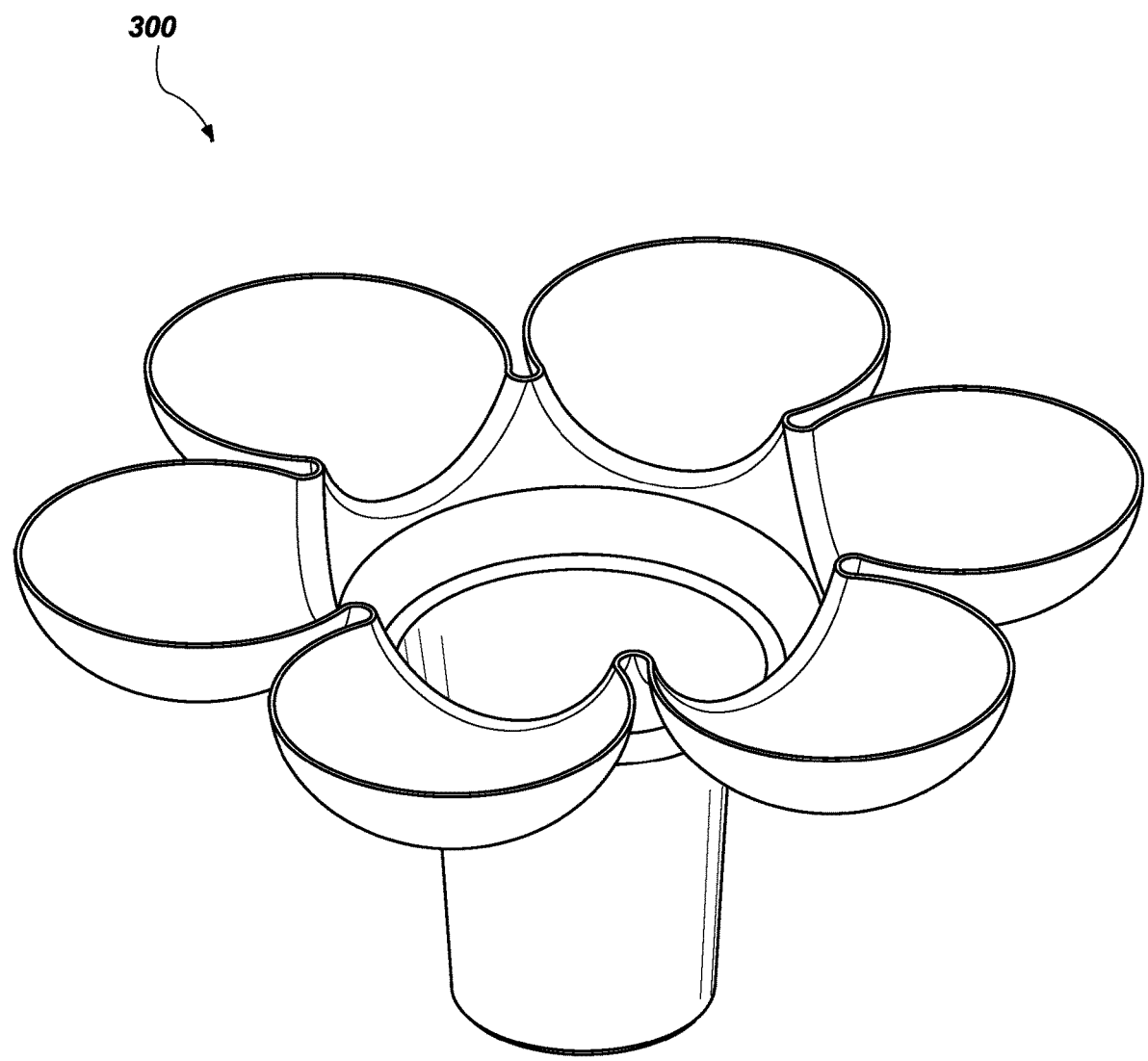
FIG. 11 illustrates a perspective view of a serving container for holding a frozen confection.

FIG. 11 illustrates a perspective view of a serving container 300 according to an embodiment of the present disclosure. The serving container 300 includes multiple cup-shaped portions for receiving shaved ice. The serving container 300 thereby forms "partitions" of shaved ice in each of the cup-shaped portions. In such an embodiment, a user may apply different toppings or flavoring syrups to each partition of shaved ice without the toppings and flavorings becoming intermixed. The embodiment illustrated in FIG. 11 may be particularly beneficial for a user who wishes to enjoy multiple different toppings of flavored syrups, or for multiple users that may be sharing the same frozen confection but wish to have different toppings or flavorings.

A method of providing a shaved-ice confection ready-for-consumption may include, for example, filling a shaved-ice serving container with shaved ice and shaping a top of the shave ice with an ice-shaping tool. The shaved-ice serving container may comprise a base portion having a lower sidewall defining a lower cavity, a top portion having an upper sidewall defining an upper cavity, the top portion having a top rim extending around the upper cavity, and the top rim having a plurality of convex regions. The ice-shaping tool may comprise an inner ice-shaping surface and a bottom rim, and the bottom rim having a plurality of convex regions. The bottom rim of the ice-shaping tool may fit over the top rim of the shaved-ice serving container such that the top rim of the shaved-ice serving container abuts against the inner ice-shaping surface of the ice-shaping tool.

Examples

The following examples pertain to further embodiments.

Example 1 is a system. The system includes a serving container comprising a cup portion and a shaping portion. The system is such that the cup portion comprises a lower sidewall defining a cup cavity for receiving a shaved ice confection. The system is such that the shaping portion comprises an upper sidewall defining one or more shaping regions. The system is such that the shaping portion comprises a top rim defining a top-most portion of the serving container. The system includes a shaping lid configured to removably connect to the serving container, wherein the shaping lid comprises a bottom rim having a shape corresponding with the top rim of the serving container.

Example 2 is a system as in Example 1, wherein the shaping lid comprises an ice-shaping surface and a top surface that is opposite to the ice-shaping surface, and wherein the ice-shaping surface comprises one or more of a depression relief or an elevation relief.

Example 3 is a system as in any of Examples 1-2, wherein the serving container further comprises a channel disposed in the upper sidewall and the shaping lid further comprises a latch disposed in the bottom rim, wherein the latch of the shaping lid is configured to connect to the channel of the serving container such that the shaping lid is removably connected to the serving container.

Example 4 is a system as in any of Examples 1-3, wherein the cup cavity has a cylindrical shape or mostly cylindrical shape for storing the shaved ice confection.

Example 5 is a system as in any of Examples 1-4, wherein the serving container is independent of the shaping lid, and wherein each of the serving container and the shaping lid is a unitary piece of injection-molded plastic.

Example 6 is a system as in any of Examples 1-5, wherein each of the serving container and the shaping lid is constructed of a food-grade material.

Example 7 is a system as in any of Examples 1-6, wherein the one or more shaping regions comprise a concave shape configured for receiving and storing the shaved ice confection.

Example 8 is a system as in any of Examples 1-7, wherein the shaping lid further comprises one or more lid shaping regions, wherein the size and shape of the one or more lid shaping regions correspond with the size and shape of the one or more shaping regions of the serving container.

Example 9 is a system as in any of Examples 1-8, wherein the shaping lid further comprises one or more lid shaping regions.

Example 10 is a system as in any of Examples 1-9, wherein a combination of the one or more lid shaping regions of the shaping lid and the one or more shaping regions of the serving container causes shaved ice disposed within the shaping portion of the serving container to assume the shape of the one or more lid shaping regions and the one or more shaping regions when the shaping lid is connected to the serving container.

Example 11 is a system as in any of Examples 1-10, wherein the one or more shaping regions of the serving container comprise a concave shape and the one or more lid shaping regions of the shaping lid comprise a convex shape.

Example 12 is a system as in any of Examples 1-11, wherein the concave shape of the one or more shaping regions of the serving container are opposite the convex shape of the one or more lid shaping regions of the shaping lid such that that depth and size of the concave shape is the same as the depth and size of the convex shape.

Example 13 is a system as in any of Examples 1-12, wherein a perimeter of the top rim of the serving container is greater than a perimeter of the bottom rim of the shaping lid such that the shaping lid can be depressed on to the serving container.

Example 14 is a system as in any of Examples 1-13, wherein, when the shaping lid is depressed on to the serving container, the shaping lid forms an airtight or mostly airtight seal with the serving container.

Example 15 is a system as in any of Examples 1-14, wherein the shaping lid further comprises a handle, and wherein the shaping lid can be removably connected to the serving container such that a user can carry the system with the handle without the shaping lid disconnecting from the serving container.

Example 16 is a system as in any of Examples 1-15, wherein the shaping portion comprises an interior surface, and wherein the one or more shaping regions are defined within the interior surface and configured for holding the shaved ice confection.

Example 17 is a system as in any of Examples 1-16, wherein the top rim of the serving container further comprises a cusp interposed between adjacent shaping regions.

Example 18 is a system as in any of Examples 1-17, wherein the upper sidewall of the serving container comprises an interior surface, and wherein the interior surface of the upper sidewall further comprises a lateral ridge formed between adjacent shaping regions of the serving container.

Example 19 is a system as in any of Examples 1-18, wherein the upper sidewall of the serving container comprises an interior surface, and wherein the interior surface of the upper sidewall further comprises a lower ridge formed between adjacent shaping region of the serving container.

Example 20 is a system as in any of Examples 1-19, wherein the cup portion is formed in one or more of a cup shape or a cone shape.

Example 21 is a system. The system includes a shaved-ice serving container comprising a base portion having a lower sidewall defining a lower cavity; a top portion having an upper sidewall defining an upper cavity, the upper sidewall having an interior surface; a plurality of concave regions formed in the interior surface of the upper sidewall; a top rim extending around the upper cavity; the top rim having a plurality of convex regions; and wherein the shaved-ice serving container is of unitary construction.

Example 22 is a system as in Example 21, wherein one of the plurality of convex regions of the top rim defines an uppermost limit of each of the plurality of concave regions formed in the interior surface of the upper sidewall.

Example 23 is a system as in any of Examples 21-22, wherein the top rim further comprises a cusp interposed between adjacent ones of the plurality of convex regions.

Example 24 is a system as in any of Examples 21-23, wherein the interior surface of the upper sidewall further comprises a lateral ridge formed between adjacent ones of the plurality of concave regions.

Example 25 is a system as in any of Examples 21-24, wherein the interior surface of the upper sidewall further comprises a lower ridge formed between each of the plurality of concave regions and the base portion.

Example 26 is a system as in any of Examples 21-25, wherein the plurality of concave regions formed in the interior surface of the upper sidewall encircle the base portion.

Example 27 is a system as in any of Examples 21-26, wherein the base portion is formed in one of a cup shape and a cone shape.

Example 28 is a system as in any of Examples 21-27, wherein the plurality of concave regions comprises between four and eight concave regions.

Example 29 is a system as in any of Examples 21-28, wherein the plurality of concave regions comprises six concave regions.

Example 30 is a system for providing a shaved-ice confection ready-for-consumption, comprising: a shaved-ice serving container comprising: a base portion having a lower sidewall defining a lower cavity, a top portion having an upper sidewall defining an upper cavity, the top portion having a top rim extending around the upper cavity, and the top rim having a plurality of convex regions; an ice-shaping tool comprising: an inner ice-shaping surface and a bottom rim, and the bottom rim having a plurality of convex regions; and wherein the bottom rim of the ice-shaping tool fits over the top rim of the shaved-ice serving container such that the top rim of the shaved-ice serving container abuts against the inner ice-shaping surface of the ice-shaping tool.

Example 31 is a system as in Example 30, wherein the upper sidewall of the top portion comprises an interior surface; and wherein the interior surface comprises a plurality of concave regions.

Example 32 is a system as in any of Examples 30-31, wherein the interior surface further comprises a lateral ridge disposed between each of the plurality of concave regions.

Example 33 is a system as in any of Examples 30-32, wherein the inner ice-shaping surface of the ice-shaping tool comprises a plurality of concave regions.

Example 34 is a system as in any of Examples 30-33, wherein the plurality of concave regions comprises a central concave region; wherein a remainder of the plurality of concave regions are disposed around the central concave region; and wherein the central concave region is larger than the remainder of the plurality of concave regions.

Example 35 is a system as in any of Examples 30-34, wherein the shaved-ice serving container is formed of unitary construction.

Example 36 is a system as in any of Examples 30-35, wherein the base portion is one of cylindrical shaped and cone shaped.

Example 37 is a method. The method includes filling a shaved-ice serving container with shaved ice; shaping a top of the shave ice with an ice-shaping tool; wherein the shaved-ice serving container comprises a base portion having a lower sidewall defining a lower cavity, a top portion having an upper sidewall defining an upper cavity, the top portion having a top rim extending around the upper cavity, and the top rim having a plurality of convex regions; wherein the ice-shaping tool comprises an inner ice-shaping surface and a bottom rim, the bottom rim having a plurality of convex regions; and wherein the bottom rim of the ice-shaping tool fits over the top rim of the shaved-ice serving container such that the top rim of the shaved-ice serving container abuts against the inner ice-shaping surface of the ice-shaping tool.

Example 38 is a method as in Example 37, wherein the upper sidewall of the top portion comprises an interior surface; and wherein the interior surface comprises a plurality of concave regions.

Example 39 is a method as in any of Examples 37-38, wherein the inner ice-shaping surface comprises a plurality of concave regions.

Example 40 is a method as in any of Examples 37-39, wherein the shaved-ice serving container is formed of unitary construction.

Example 41 is a system. The system includes a serving container comprising a cup portion and a shaping portion. The system is such that the cup portion comprises a lower sidewall defining a cup cavity for receiving a shaved ice confection. The system is such that the shaping portion comprises an upper sidewall defining one or more shaping regions. The system is such that the shaping portion comprises a top rim defining a top-most portion of the serving container. The system includes a shaping lid configured to removably connect to the serving container, wherein the shaping lid comprises a bottom rim having a shape corresponding with the top rim of the serving container. The shaping lid further comprises one or more lid shaping regions that cause shaved ice disposed within the shaping portion of the serving container to assume the shape of the one or more lid shaping regions and the one or more shaping regions when the shaping lid is in contact with the serving container. The one or more shaping regions of the serving container comprise a concave shape. The one or more shaping regions of the lid shaping regions comprise a convex shape. The concave shape of the one or more shaping regions of the serving container mirror the convex shape of the one or more lid shaping regions of the shaping lid such that the depth and size of the concave shape is the same or similar to the depth and size of the convex shape.

Example 42 is a system. The system includes a serving container comprising a cup portion and a shaping portion. The system is such that the cup portion comprises a lower sidewall defining a cup cavity for receiving a shaved ice confection. The system is such that the shaping portion comprises an upper sidewall defining a plurality of shaping regions. The system is such that the shaping portion comprises a top rim defining a top-most portion of the serving container. The system includes a shaping lid configured to removably connect to the serving container, wherein the shaping lid comprises a bottom rim having a shape corresponding with the top rim of the serving container. Each of the plurality of shaping regions comprise a concave shape mimicking a petal of a flower, such that the plurality of shaping regions mimic a flower-like shape. The shaping lid comprises a plurality of lid shaping regions corresponding with the plurality of shaping regions of the serving container. Each of the plurality of lid shaping regions mimic the shape of a petal such that the plurality of the lid shaping regions mimic a flower-like shape.

Example 43 is a system. The system includes a serving container comprising a cup portion and a shaping portion. The system is such that the cup portion comprises a lower sidewall defining a cup cavity for receiving a shaved ice confection. The system is such that the shaping portion comprises an upper sidewall defining one or more shaping regions. The system is such that the shaping portion comprises a top rim defining a top-most portion of the serving container. The system includes a shaping lid configured to removably connect to the serving container, wherein the shaping lid comprises a bottom rim having a shape corresponding with the top rim of the serving container. The one or more shaping regions comprises two shaping regions in the shape of a cartoon mouse ear. The shaping lid further comprises one or more lid shaping regions corresponding with the one or more shaping regions, wherein the one or more lid shaping regions comprises two lid shaping regions in the shape of the cartoon mouse ear. The system is such that, when shaved ice is disposed within the serving container, and the shaping lid is in contact with the serving container, the shaved ice assumes the shape of a cartoon mouse having the two cartoon mouse ears.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system comprising:
    a serving container comprising a cup portion and a shaping portion, wherein:
        the cup portion comprises a lower sidewall defining a cup cavity for receiving a shaved ice confection;
        the shaping portion comprises an upper sidewall defining a plurality of shaping regions; and
        the shaping portion comprises a top rim defining a top-most portion of the serving container; and
    a shaping lid configured to removably engage with the serving container, wherein the shaping lid comprises a bottom rim comprising a plurality of shaping regions that correspond with the plurality of shaping regions of the upper sidewall of the shaping portion of the serving container and the bottom rim having a shape corresponding with the top rim of the serving container;
    wherein the shaping lid comprises a plurality of surface reliefs disposed on an ice-shaping surface of the shaping lid, and wherein the plurality of surface reliefs of the shaping lid and the shaping portion of the serving container together are configured to imprint a continuous and integrated shape on the shaved ice confection.

2. The system of claim 1, wherein the shaping lid comprises the ice-shaping surface and a top surface that is opposite to the ice-shaping surface, and wherein the ice-shaping surface comprises one or more of a depression relief or an elevation relief.

3. The system of claim 1, wherein the serving container further comprises a channel disposed in the upper sidewall and the shaping lid further comprises a latch disposed in the bottom rim, wherein the latch of the shaping lid is configured to connect to the channel of the serving container such that the shaping lid is removably connected to the serving container.

4. The system of claim 1, wherein the cup cavity has a cylindrical shape or mostly cylindrical shape for storing the shaved ice confection.

5. The system of claim 1, wherein the serving container is independent of the shaping lid, and wherein each of the serving container and the shaping lid is a unitary piece of injection-molded plastic.

6. The system of claim 1, wherein each of the serving container and the shaping lid is constructed of a food-grade material.

7. The system of claim 1, wherein the plurality of shaping regions comprise a concave shape configured for receiving and storing the shaved ice confection.

8. The system of claim 1, wherein a combination of the one or more lid shaping regions of the shaping lid and the plurality of shaping regions of the serving container causes shaved ice disposed within the shaping portion of the serving container to assume the shape of the one or more lid shaping regions and the plurality of shaping regions when the shaping lid is in contact with to the serving container.

9. The system of claim 1, wherein the plurality of shaping regions of the serving container comprises a concave shape and the one or more lid shaping regions of the shaping lid comprise a convex shape.

10. The system of claim 9, wherein the concave shape of the plurality of shaping regions of the serving container mirror the convex shape of the one or more lid shaping regions of the shaping lid such that that depth and size of the concave shape is the same as the depth and size of the convex shape.

11. The system of claim 1, wherein a perimeter of the top rim of the serving container is greater than a perimeter of the bottom rim of the shaping lid such that the shaping lid can be depressed on to the serving container.

12. The system of claim 11, wherein, when the shaping lid is depressed on to the serving container, the shaping lid forms an airtight or mostly airtight seal with the serving container.

13. The system of claim 1, wherein the shaping lid further comprises a handle, and wherein the shaping lid can be removably connected to the serving container such that a user can carry the system with the handle without the shaping lid disconnecting from the serving container.

14. The system of claim 1, wherein the shaping portion comprises an interior surface, and wherein the plurality of shaping regions are defined within the interior surface and configured for holding the shaved ice confection.

15. The system of claim 1, wherein the top rim of the serving container further comprises a cusp interposed between adjacent shaping regions.

16. The system of claim 1, wherein the upper sidewall of the serving container comprises an interior surface, and wherein the interior surface of the upper sidewall further comprises a lateral ridge formed between adjacent shaping regions of the serving container.

17. The system of claim 1, wherein the upper sidewall of the serving container comprises an interior surface, and wherein the interior surface of the upper sidewall further comprises a lower ridge formed between adjacent shaping region of the serving container.

18. The system of claim 1, wherein the cup portion is formed in one or more of a cup shape or a cone shape.

* * * * *